United States Patent [19]

Kalka et al.

[11] 4,184,029

[45] * Jan. 15, 1980

[54] PROCESS FOR THE PRODUCTION OF HIGH-DUROMETER POLYMERS OF VINYL CHLORIDE WITH PH CONTROL

[75] Inventors: Josef Kalka, Herten; Hermann Winter, Marl, both of Fed. Rep. of Germany

[73] Assignee: Chemische Werke Huls Aktiengesellschaft, Marl, Fed. Rep. of Germany

[*] Notice: The portion of the term of this patent subsequent to Jan. 9, 1996, has been disclaimed.

[21] Appl. No.: 724,002

[22] Filed: Sep. 16, 1976

[30] Foreign Application Priority Data

Oct. 1, 1975 [DE] Fed. Rep. of Germany ....... 2543823

[51] Int. Cl.$^2$ .............................................. C08F 6/14
[52] U.S. Cl. .................................... 526/216; 526/229; 526/344.2; 528/480; 528/486; 528/487; 528/502
[58] Field of Search .................... 526/213, 216, 344.2, 526/345; 528/480, 486, 487, 502

[56] References Cited

U.S. PATENT DOCUMENTS

| | | | |
|---|---|---|---|
| 2,829,134 | 4/1958 | DeCoene | 526/216 |
| 2,957,858 | 10/1960 | O'Donnell | 526/213 |
| 3,311,579 | 3/1967 | Donat | 526/213 X |
| 3,883,494 | 5/1975 | Winter | 526/344 |
| 3,993,857 | 11/1976 | Smolinski | 526/344 X |

*Primary Examiner*—C. A. Henderson
*Attorney, Agent, or Firm*—Millen & White

[57] ABSTRACT

An improved process for the production of emulsifier-containing vinyl chloride polymers suitable for hard processing, the particle diameter of 90% of which is more than 63 $\mu$, by polymerization of vinyl chloride and optionally monomers copolymerizable therewith in an aqueous emulsion in the presence of water-soluble catalysts and alkali salts of carboxylic acids as emulsifiers at pH 9.5–11.5 and spray-drying the thus-obtained latex, is characterized by conducting the polymerization in a dispersion containing at least 45% by weight of monomers with sodium or potassium salts of fatty acids of 8–18 carbon atoms as emulsifiers to a conversion of at least 80%, and, during the spray-drying step, reducing the pH to 6.0–8.0.

12 Claims, No Drawings

PROCESS FOR THE PRODUCTION OF HIGH-DUROMETER POLYMERS OF VINYL CHLORIDE WITH PH CONTROL

BACKGROUND OF THE INVENTION

Polymers of vinyl chloride suitable for processing into high-durometer type products must exhibit satisfactory pouring properties, which are produced by a coarse, uniform grain. In general, particle distribution required for high-durometer processing is more than 90% larger than 63μ and less than 50% larger than 160μ. Other desirable properties of polymers intended for hard or high-durometer processing are high thermal stability as well as ability to slip and move easily within the extruder.

Polymers of vinyl chloride suitable for hard processing have been made in the presence of alkali salts of fatty acids as emulsifiers. The polymerization is conducted in an alkaline medium because alkali metal salts of fatty acids have pH values of at least 9.5 in an aqueous medium, and thus are fully effective as emulsifiers only at these pH values.

Polymers obtained by polymerization in the presence of alkali salts of fatty acids as emulsifiers have considerably higher thermal stability than polymers obtained by polymerization in the presence of alkyl sulfates, alkyl and alkylaryl sulfonates and other customary emulsifiers (cf. Table 2). Polymers produced by prior art processes with alkali salts of fatty acids as emulsifiers, however, have an unsatisfactory, slightly yellow inherent color.

It is an object of the present invention to improve the inherent color of vinyl chloride polymers manufactured with alkali metal salts of fatty acids as emulsifiers.

SUMMARY OF THE INVENTION

This invention relates, in a process for the production of an emulsifier-containing high-durometer particulate polymer of vinyl chloride, at least 90% by weight of which has a particle diameter greater than 63μ, by polymerization of vinyl chloride or a monomer mixture of vinyl chloride and a monomer copolymerizable therewith in an aqueous emulsion containing at least 45% by weight of monomers in the presence of a water-soluble catalyst and one or more sodium or potassium salts of carboyxlic acids of 8–18 carbon atoms as emulsifier at pH 9.5–11.5 to a conversion of at least 80%, and by spray-drying a thus-obtained latex, to the improvement wherein the pH of the emulsifier-containing high-durometer polymer latex is reduced to 6.0–8.0 simultaneously with the spray-drying step.

In another aspect, this invention relates to high-durometer type polymers and copolymers of vinyl chloride, obtained by the improved process given above.

DETAILED DESCRIPTION

Spray drying is carried out so that polyvinyl chloride powders are obtained with at least 90% by weight of particle size larger than 63μ and more preferably so that at least 90% by weight is larger than 63μ, less than 50% by weight larger than 160μ, and less than 15% larger than 300μ. Such grain fractions can be produced by a spraying step using two-fluid nozzles with a subsequent screening or by spraying the dispersion through a single nozzle. Examples of single material nozzles are disclosed in Vauck und Muller (1966), published by Steinkopff, Dresden and Leipzig, pp. 1, 276 and 277.

For a spraying step using a biaxial nozzle to obtain a coarse powder, the nozzle described in German Pat. No. 1,263,619 is typical of those which are suitable. In order to attain particle distribution of 90% > 63μ, screening to remove the finer grains is conducted after drying.

Suitable acids for reducing pH during the spray-drying step include, but are not limited to, aqueous solutions of hydrochloric, sulfuric, oxalic, formic and acetic acids. The pH value of the PVC powder is measured in the form of a slurry with water.

The quantity of acid added can be adapted to the amount of dispersion by calculation from a titration curve of the dispersion. Alternatively, acid can be added purely empirically.

The degree of color improvement depends both on the acid utilized for pH reduction and on the pH level of the dispersion. The more the pH of the dispersion is reduced during spray-drying, the greater is the lightening observed. In general, reduction of pH to values below 6.0 is unnecessary, because no further color improvement is obtained below pH 6.0. The greatest reduction of discoloration results from the use of hydrochloric acid to lower pH. Formic, oxalic, sulfuric and acetic acids give slightly less color reduction.

Aqueous acid solutions can be utilized in concentrations between 1% and 25%. When a slight excess of alkali and emulsifier content in the dispersion are employed, the concentration of the aqueous acid solution selected will be correspondingly lower. At high emulsifier contents and perhaps high excess of alkali in the dispersion and using a weaker acid, the concentration of acid will preferably be higher.

Acidic compounds required to reduce pH during the step in which the mixture is discharged through nozzles are sprayed into the drying tower, along with the dispersion, in the form of an aqueous solution through additional nozzles installed at the spraying tower. It is important that a homogeneous distribution of acidic compound in the dispersion be attained during the spray-drying step. For this reason, it is preferred to arrange the nozzles for supplying acid uniformly around the tower. It is possible to employ biaxial nozzles as well as single nozzles. Alternatively, gaseous HCl can be added to the warm drying air.

A suitable corrosion-resistant material for the nozzles is stainless steel.

The process of this invention can be used for production of homo- and copolymers of vinyl chloride suitable for hard processing. Suitable comonomers are all copolymerizable compounds, but those having a group —CH=C< are preferred, including but not limited to vinylidene chloride; vinyl esters of carboxylic acids of up to 4 carbon atoms, such as vinyl acetate, vinyl formate; acrylic and methacrylic esters of up to 8 carbon atoms in the alkanol-derived function thereof; and unsaturated dicarboxylic acids, such as maleic and fumaric acids. Up to about 30% by weight of one or more comonomers can be present in the polymerization charge. Preferably up to 30% by weight of comonomer is in monomer mixture.

Suitable catalysts are water-soluble compounds customarily employed in emulsion polymerization of vinyl chloride, including water-soluble persulfates, e.g., sodium or potassium persulfate; a water-soluble persulfate combined with a reducing agent, e.g., a water-soluble bisulfite, hydrosulfite, thiosulfate, or sulfoxylate, or hydrazine or formaldehyde; hydrogen peroxide combined with a reducing agent, such as a bisulfite, hydrazine, hydroxylamine, or ascorbic acid; or water-soluble persulfate combined with hydrogen peroxide and an activating component, such as a copper salt, used in an alkaline medium with complexing agents, such as a pyrophosphate.

Preferably a combined potassium persulfate/copper nitrate/sodium pyrophosphate catalyst is used.

Suitable emulsifiers include sodium and potassium salts of unbranched and branched fatty acids of 8-18 carbon atoms, such as, for example, sodium or potassium caprate, sodium or potassim laurate, sodium or potassium myristate, sodium or potassium palmitate, or sodium or potassium stearate. Sodium laurate and sodium myristate are preferred.

The latex obtained after the polymerization should generally contain no more than about 1% by weight of emulsifier, because high emulsifier concentrations generally have an adverse effect on the processing operation and on properties of the final products. High emulsifier levels tend to impair transparency and increase water sensitivity of the polyvinyl chloride resin. However, higher emulsifier concentrations can be advantageous owing to increased electrical values, specifically, electrical conductivity of the polymers and the articles produced therefrom so that electrostatic charging of the articles is reduced.

Production of polymers suitable for preliminary or rough spraying through nozzles is conducted in emulsions containing at least 45% by weight of monomers to satisfy the economic requirements of modern technical processes. High monomer concentrations ensure a high space-time yield in polymerization reactors and in the spray-drying tower and also reduce energy consumption during the spray-drying step.

Production of a typical particularly high-percentage emulsifier-polymer dispersion is described in DAS (German Published Application) No. 1,964,029, in accordance with which emulsifier is added during the polymerization step by a specified program. The polymerization can be conducted at usual temperatures between 35° and 70° C. under pressures of 5.5 to 13 bars.

Spray-drying step can be carried out in customary spray-drying devices as described, for example, in "Ullmanns Encyclopaedie der technischen Chemie" (Ullmann's Encyclopedia of Technical Chemistry), (1951) 1:602.

Particle fractions of the desired size distribution can be obtained directly by a spray-drying step using single nozzles. In this type of spraying procedure, the dispersion is forced through one or more nozzles having a diameter of 1.5-3.0 mm. under a pressure of 5-30 atmospheres gauge.

The atomizer disk spraying process can be used to obtain particles distributions suitable for the coarse spraying step.

The following examples serve to explain the process of this invention in greater detail.

Without further elaboration, it is believed that one skilled in the art can, using the preceding description, utilize the present invention to its fullest extent. The following preferred specific embodiments, are, therefore, to be construed as merely illustrative and not limitative of the remainder of the disclosure in any way whatsoever.

COMPARATIVE EXAMPLE 1

With exclusion of atmospheric oxygen, 2,200 l. of dimineralized water is charged to a pressure vessel having a capacity of 6 m.$^3$, along with a previously-prepared solution of 60 g. of copper nitrate as activating component and 1,440 g. of sodium pyrophosphate as complexing agent for the copper nitrate in 5,000 g. of water. The batch is adjusted to pH 11.0 with sodium hydroxide.

The contents of the reactor vessel are heated to about 56° C. and, with agitation, 700 kg. of vinyl choride and 20 l. of activator solution (3% aqueous potassium persulfate solution) are added thereto. After onset of the polymerization, an emulsifier solution (3.5% sodium laurate in water with an excess of 0.15 equivalent of NaOH based on lauric acid), vinyl chloride, and 1.5% hydrogen peroxide solution are added by the following program:

| Hour | Emulsifier l. | Vinyl Chloride kg. | Hydrogen Peroxide l. | Conversion % |
|---|---|---|---|---|
| 0.75 | 3 = 105 g. | 500 | 5 | 5.5 |
| 1.5 | 6 = 210 g. | 500 | 5 | 10.5 |
| 2.25 | 11 = 385 g. | 500 | 5 | 28.2 |
| 3.0 | 48 = 1680 g. | 500 | 5 | 40.7 |
| 3.75 | 134 = 4690 g. | | | 53.5 |
| 4.5 | 230 = 8050 g. | | | 62.0 |
| 5.25 | 96 = 3360 g. | | | 67.5 |

The polymerization is terminated after about 6-7 hours. A latex is obtained having a solids content of 48% and K-value of 70 (Fikentscher K-value: Lunge-Berl 1934/5:945). The final pH is 11.0, the surface tension is 48 dyn/cm., and the emulsifier content is 0.75% by weight.

The thus-obtained dispersion is passed through nozzles of a conventionally-constructed spraying tower having a capacity of about 200 m$^3$. The spraying tower contains 10 single nozzles, having an orifice diameter of 2.0 mm., through each of which is passed 110 l. of dispersion per hour. The tower inlet temperature is 165° C., the tower outlet temperature is 80° C., the pressure of air through the nozzle is 3.5 atmospheres gauge, and the amount of warm air (165° C.) is 22,000 Nm$^3$/h.

The dispersion is maintained under a pressure of 8 atmospheres gauge. PVC powder discharged from the tower and separated in a filter has the following particle size distribution:

96% of the powder has a diameter larger than 63$\mu$; 40% by weight has a diameter larger than 160$\mu$; and 6% by weight has a diameter above 300$\mu$.

The following properties of the powder are tested as described hereinbelow: thermal stability and color number of thermally-undegraded product. Results are given in Table 1.

COMPARATIVE EXAMPLE 2

The following materials are introduced, per hour, into an autoclave having a capacity of 3 m.$^3$ and equipped with a cooling jacket and a vane agitator:
140 l. of vinyl chloride,
116 l. of aqueous 2.0% sodium laurate solution,
2 l. of 3% aqueous potassium persulfate solution,
2 l. of 0.5% aqueous hydrogen peroxide solution.

The polymerization temperature is maintained at 40° C. The conversion is about 90%. A dispersion having a solids content of 49%, pH 9.5, K-value of 70, and surface tension of 37.4 dyn/cm. is discharged continuously from the bottom of the container.

The dispersion is worked up as described in Comparative Example 1. Thermal stability and inherent color of the powder are given in Table 1.

EXAMPLE 1

The dispersion prepared in Comparative Example 1 is spray-dried as described above. However, three additional single nozzles are installed at the tower between the dispersion nozzles spaced at a distance of ⅓ of the circumference of the tower from each other. These additional nozzles have an outlet orifice of 0.8 mm. in diameter. Through these nozzles is sprayed 40 l./h. of 25% formic acid. The formic acid solution is maintained under a pressure of 1.1 bars. PVC powder discharged from the other has a particle distribution as described in Comparative Example 1 and pH of 7.9. The color number and thermal stability as listed in Table 1.

EXAMPLE 2

The procedure of Example 1 is followed, except that a 2.0% hydrochloric acid solution is used instead of formic acid. The pH of the thus-obtained powder is 7.1. The color number and thermal stability are included in Table 1.

EXAMPLE 3

The procedure of Example 1 is employed, except that 6.5% hydrochloric acid is used rather than formic acid. The pH of the thus-obtained powder is 6.4. The color number and thermal stability are contained in Table 1.

EXAMPLE 4

The process of Example 1 is followed, except that 3.0% sulfuric acid is employed in place of formic acid. The pH of the thus-produced powder is 7.1. The color number and thermal stability are given in Table 1.

EXAMPLE 5

The polymerization is conducted in the same way as Comparative Example 2, including the spray-drying step of Example 2. The pH of the thus-obtained powder is 7.6. The color number and thermal stability are set forth in Table 1.

Testing of Thermal Stability and Inherent Color

The powder to be tested is mixed in a porcelain dish with plasticizer and stabilizer in the following proportion:
100 parts by weight of PVC,
30 parts by weight of "VESTINOL AH" (dioctyl phthalate),
1 part by weight of Ba-Cd salt of a carbon acid as stabilizer.

On a rolling mill frame, the mixture is rolled for 5 minutes and then rolled into a sheet 1.0 mm. thick. Squares of 18×18 mm. are punched out from the sheet, heated to a temperature of 180° in a rotary Brabender oven. Samples are withdrawn at intervals of 5 minutes. The thermal load can be observed from the discoloration. The time reported is that of the reading immediately prior to the sample's turning black and is a measure of thermal stability.

For the evaluation of inherent color, a PVC sample which has been subjected to a temperature load of 180° C. and has not as yet degraded thermally, is used. The suspension polyvinyl chloride was prepared as described in the British specification No. 1,257,517 (=German Pat. No. 1 595 431). The color-rating scale was received by assigning color numbers to the polymer samples according to their inherent colour. The polymer with most bad inherent colour received Number 20 (Comparative Example 2); the polymer with best inherent colour received Number 1 (Suspension PVC). The other polymer samples got numbers between these extreme values according to the degree of inherent colour; the degree was received by visual measuring.

TABLE 1

| PVC | Thermal Stability (min.) | Color Number |
|---|---|---|
| Suspension PVC | 65 | 1.0 |
| Comp. Example 1 | 65 | 10 |
| Comp. Example 2 | 45 | 20 |
| Example 1 | 75 | 3.0 |
| Example 2 | 65 | 2.5 |
| Example 3 | 55 | 1.5 |
| Example 4 | 65 | 3.0 |
| Example 5 | 60 | 2.5 |

As shown by the results of Table 1, color numbers of the polymers can be improved by about one order of magnitude compared to prior art emulsion-polymerized products using the method of the present invention.

Table 2 gives a comparison of the thermal stability of polyvinyl chloride produced with various emulsifiers in order to make apparent differences in thermal stability depending on the type of emulsifier employed:

TABLE 2

| Emulsifier 0.75% | Alkyl Sulfate | Alkylaryl Sulfonate | Sodium Laurate |
|---|---|---|---|
| Thermal stability (minutes) | 20 | 25 | 70 |

As shown above, vinyl chloride polymers having considerably higher thermal stability are produced using alkali metal salts of carboxylic acids as emulsifiers than with other conventional types of emulsifiers.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. In a process for the production of an emulsifier-containing high-durometer particulate polymer of vinyl chloride, at least 90% by weight of which has a particle diameter greater than 63μ, by polymerization of vinyl chloride or a monomer mixture of vinyl chloride and a monomer copolymerizable therewith, in an aqueous emulsion containing at least 45% by weight of monomers in the presence of a water-soluble catalyst and one or more sodium or potassium salts of fatty acids of 8–18 carbon atoms as emulsifier, at pH 9.5–11.5 to a conversion of at least 80%, and by spray-drying a thus-obtained latex, the improvement wherein the pH of the emulsifier-containing high-durometer polymer latex is reduced from 9.5–11 to 6.0–8.0 simultaneously with the spray-drying step to produce said particulate polymer of vinyl chloride, at least 90% by weight of which has a particle diameter greater than 63 microns.

2. The process of claim 1, wherein particle distribution of the polymer is at least 90% by weight above 63μ particle diameter, less than 50% larger than 160μ and less than 15% is larger than 300μ.

3. The process of claim 1, wherein vinyl chloride is the sole polymerizable monomer.

4. The process of claim 1, wherein the monomer mixture contains up to 30% by weight of vinylidene chloride, vinyl esters of carboxylic acids of up to 4 carbon atoms, acrylic or methacrylic esters of up to 8 carbon atoms in the alkanol-derived function thereof or unsaturated dicarboxylic acids.

5. The process of claim 1, wherein the water-soluble catalyst is a persulfate, a persulfate combined with a reducing agent, hydrogen peroxide combined with a reducing agent, or a water-soluble persulfate combined with hydrogen peroxide and an activating component.

6. The process of claim 1, wherein the latex and an acid for reducing pH to 6.0-8.0 are sprayed in a drying tower through one or more biaxial nozzles and a thus-obtained product is screened.

7. The process of claim 1, wherein the latex and an acid for reducing pH from 6.0-8.0 are sprayed through separate single nozzles.

8. The process of claim 8, wherein the latex is sprayed through nozzles of 1.5-3.0 mm. diameter at a gauge pressure of 5-30 atmospheres.

9. The process of claim 1, wherein pH of the latex is reduced during spray drying with an aqueous solution of hydrochloric, sulfuric, oxalic, formic or acetic acid.

10. The process of claim 1, wherein vinyl chloride is the sole monomer, the water-soluble catalyst is hydrogen peroxide-potassium sulfate activated by copper nitrate, and the emulsifier is sodium laurate.

11. The process of claim 1, wherein vinyl chloride is the sole monomer, the water-soluble catalyst is hydrogen peroxide-potassium persulfate and the emulsifier is sodium laurate.

12. The process of claim 1 wherein vinyl chloride is the sole monomer and the pH of the latex is reduced simultaneously with the spray-drying step by mixing a spray of the latex and a spray of an aqueous solution of the acid in a drying tower, whereby a homogenous distribution of the acid in the dispersion is attained.

* * * * *